United States Patent
Tauber

(10) Patent No.: US 12,052,408 B2
(45) Date of Patent: Jul. 30, 2024

(54) DEPTH BASED 3D RECONSTRUCTION USING AN A-PRIORI DEPTH SCENE

(71) Applicant: Intel Corporation, Santa Clara, CA (US)

(72) Inventor: Elad Tauber, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 16/801,820

(22) Filed: Feb. 26, 2020

(65) Prior Publication Data

US 2020/0195904 A1 Jun. 18, 2020

(51) Int. Cl.
| | |
|---|---|
| *G06T 7/50* | (2017.01) |
| *G06N 3/02* | (2006.01) |
| *G06T 7/55* | (2017.01) |
| *G06T 15/00* | (2011.01) |
| *G06T 17/00* | (2006.01) |
| *G06T 19/00* | (2011.01) |
| *G06V 10/74* | (2022.01) |
| *G06V 10/84* | (2022.01) |
| *H04N 13/156* | (2018.01) |
| *H04N 13/349* | (2018.01) |

(52) U.S. Cl.
CPC .......... *H04N 13/156* (2018.05); *G06N 3/02* (2013.01); *G06T 7/50* (2017.01); *G06T 7/55* (2017.01); *G06T 15/00* (2013.01); *G06T 17/00* (2013.01); *G06T 19/00* (2013.01); *G06V 10/761* (2022.01); *H04N 13/349* (2018.05); *G06V 10/84* (2022.01)

(58) Field of Classification Search
None
See application file for complete search history.

(56) References Cited

U.S. PATENT DOCUMENTS

| 9,269,187 B2* | 2/2016 | Chang | G06T 17/00 |
| 2014/0184496 A1* | 7/2014 | Gribetz | G06F 3/0482 |
| | | | 345/156 |
| 2018/0205941 A1* | 7/2018 | Kopf | H04N 13/261 |

(Continued)

FOREIGN PATENT DOCUMENTS

| WO | WO-2014150017 A1 * | 9/2014 | ............ G06T 5/003 |
| WO | WO-2020069049 A1 * | 4/2020 | ........... G06N 3/0454 |

OTHER PUBLICATIONS

R. T. Collins;: "A Space-Sweep Approach to True Multi-Image Matching"; Published in: Proceedings CVPR IEEE Computer Society Conference on Computer Vision and Pattern Recognition, Date of Conference Jun. 1996, San Francisco, CA.

(Continued)

*Primary Examiner* — Tyler W. Sullivan
(74) *Attorney, Agent, or Firm* — Hanley, Flight & Zimmerman, LLC

(57) ABSTRACT

A system for depth-based 3D reconstruction using an a-priori depth scene is described herein. The method includes a static depth map extractor to a static scene depth map of a scene for a plurality of camera views. The system also includes a dynamic scene plane sweeper to sweep through depth planes of a dynamic scene based on the depth map from the static scene to infer a depth map of the dynamic scene for each camera view. Finally, the system includes a fusion mechanism to fuse a three-dimensional point cloud from the depth map of the dynamic scene from each camera view.

26 Claims, 8 Drawing Sheets

(56) References Cited

U.S. PATENT DOCUMENTS

2019/0349571 A1* 11/2019 Herman ............... H04N 13/271
2020/0082541 A1* 3/2020 Jouppi ................... G06T 7/194
2020/0195910 A1* 6/2020 Han ..................... H04N 13/156

OTHER PUBLICATIONS

Gallup et al.;: "Real-Time Plane Sweeping Stereo With Multiple Sweeping Directions"; Published in: 2007 IEEE Conference on Computer Vision and Pattern Recognition, Date of Conference Jun. 2007, Minneapolis MN.

Galliani et al.;: "Massively Parallel Multiview Stereopsis by Surface Normal Diffusion"; Published in: 2015 IEEE International Conference on Computer Vision (ICCV), Date of Conference Dec. 2015, Santiago, Chile.

Bleyer et al.;: "Patchmatch Stereo-Stereo Matching With Slanted Support Windows"; Proceedings of the British Machine Vision Conference, (BMVA Press) Sep. 2011, University of Dundee.

Shonberger et al.;: "Pixelwise View Selection for Unstructured Multi-View Stereo"; European Conference on Computer Vision, Oct. 2016, the Netherlands.

Yao et al.;: "MVSNET: Depthe Infernece for Unstructured Multi-View Stereo"; Computer Science > Computer Vision and Pattern Recognition, [Submitted on Apr. 7, 2018 (v1), last revised Jul. 17, 2018 (this version, v2)].

Flynn et al.;: "Deepview: View Synthesis Withlearned Gradient Descent", Computer Science > Computer Vision and Pattern Recognition, Submitted Jun. 2019.

* cited by examiner

200

600

DEPTH BASED 3D RECONSTRUCTION USING AN A-PRIORI DEPTH SCENE

BACKGROUND

In various contexts, such as for sporting events or other high-profile events, multiple cameras may be installed to capture a number of views of a scene (e.g., at the circumference of a stadium) where the event occurs. The installation of multiple cameras, segmentation, and three-dimensional (3D) reconstruction techniques are used to create volumetric contents for the purpose of providing an immersive media experience for users. For example, simultaneous or contemporaneous video of the scene is captured and a point cloud may be built to create a volumetric model of the scene. The point cloud may be then rendered with the captured texture from multiple captured camera images of the scene in every moment.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As generally discussed above, a three-dimensional (3D) volumetric model of a scene may include a point cloud that is rendered with a captured texture from multiple camera images of a scene. A virtual camera or view within the volumetric model may then be used to navigate in the 3D space represented by the volumetric model. Observed views are rendered to enable multiple degrees of freedom for a highly immersive user experience.

Creating a real-time volumetric video of the event requires very high computational power. Furthermore, the final system output (e.g., rendered image on 3D model) should have very high quality to maintain the immersive user experience and ideally operate in real time. The present techniques enable a reduction in computational power used during the creation of a 3D reconstruction of a scene in real time. These improvements are essential to providing immersive user experiences in 3D scenes attained by multiple cameras.

The depth-based 3D reconstruction as described herein relies on an a-priori depth scene, and may be used with any number of computer aided tasks. Generally, the particular hardware, software, and algorithms used in combination with 3D reconstruction may vary dependent on the particular task at hand. For example, in the case of far-field range and/or real-time reconstruction, typical hardware that is dedicated to depth sensing (e.g. structured light, RGBD or LIDAR) fails to meet real-time and/or quality demands for 3D reconstruction. In embodiments, applications using far-field range and/or real-time reconstruction may rely on high-quality imaging sensors, a dedicated software and algorithmic bundle based on multi-view-stereo (MVS). Generally, the methods, devices, apparatuses, computing platforms, and articles described herein relate to a continuous 3D reconstruction for the generation of high-quality virtual views within a scene.

As described above, to generate virtual views within a captured scene using frames of the scene captured using multiple cameras, a very high-quality 3D reconstruction of the scene is used. The generation of the virtual views seeks to provide real time video streaming with six degrees-of-freedom (6 DOF) within the environment, such that views from positions where physical cameras cannot be placed are interactively provided to a user. The processing associated with generating the virtual views produces high quality views with a minimum latency so that the visual result is immersive for the viewer. In some cases, the 3D dynamic motion of objects and persons in a scene (e.g., players on a pitch, basketball floor, etc.) is based on voxels (three dimensional pixels). In this example, a fidelity of every single voxel is crucial for the total look of the immersive video output.

Figure 1:
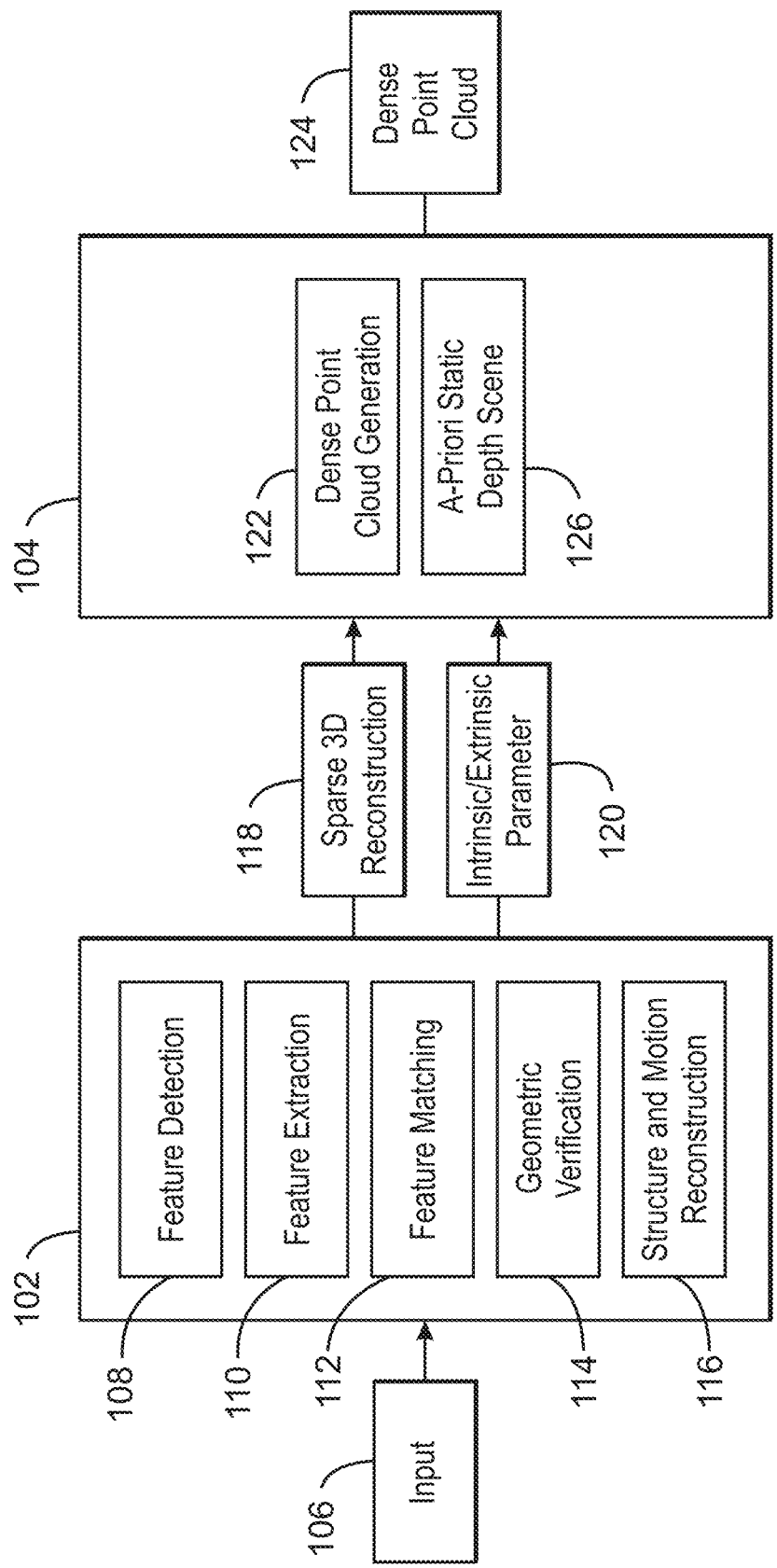
FIG. 1 is a process flow diagram of an MVS.

FIG. 1 is a block diagram of a an example multi-view stereo (MVS) processing 100. In the example of FIG. 1, MVS processing 100 as discussed herein may include a first stage 102 that provides calibration parameters and a sparse 3D reconstruction of a scene and a second stage 104 that performs dense point cloud generation. The first stage 102 may be characterized as structure from motion (SfM) processing and includes reconstructing the 3D structure from a projection of the 3D structure on a series of images (e.g., the projective geometry). The input 106 to SfM processing is a set of overlapping images of the same scene or object taken from varying viewpoints. The output of SfM processing is a sparse 3D reconstruction 118 of the object or scene and the reconstructed intrinsic and extrinsic camera parameters 120 of all the images.

The SfM processing may be further divided into stages including feature detection 108, feature extraction 110, feature matching 112, geometric verification 114, and structure and motion reconstruction 116. Generally, feature detection 108 discovers two-dimensional (2D) features in each input image, and feature extraction separates these features from the remainder of each input image. Feature matching 112 matches the 2D features across a number of input images, and geometric verification checks the consistency for each matched feature between different views. The structure and motion reconstruction 116 generally constructs tracks from the matched features. The tracks may be used to generate a SfM model, which can be refined via bundle adjustment.

As illustrated, the first processing stage 102 outputs a sparse point cloud 118 of an object or objects in the scene and calibrates all of cameras trained on the object or objects. The camera calibration results include the 3D camera position of each camera and a 3D orientation of each camera within a coordinate system imposed on the scene, as well as intrinsic parameters of each camera. The camera parameters 120 output by the first processing stage may include extrinsic and intrinsic camera parameters. As used herein, the term position (or location) generally indicates coordinates of an object, feature point, camera, etc. within a coordinate system imposed on the scene (e.g., x, y, and z) and the term orientation, as the name indicates, provides the orientation of the object at the position and may be expressed in terms of pitch, yaw, and roll, for example. The term pose is used to indicate both the position and orientation of an item. Notably, in some instances, items may be provided a position only and, in some instances items are provided both position and orientation (i.e. a pose). Furthermore, the terms 3D location or 3D position indicates a location or position that may be provided with 3 degrees of freedom (e.g., in a spatial coordinate system), while the terms 2D location or 2D position indicate a location or position that may be provided with 2 degrees of freedom (e.g., in a planar coordinate system such as on an image plane).

In a second stage 104, the sparse 3D reconstruction 118 and camera parameters 120 output by the first stage 102 are used to generate a dense point cloud 124. The dense point cloud generation 122 may be based on a translation of mutual two-dimensional (2D) information between frames from neighboring cameras to a 3D localization of points and features to derive the dense point cloud 124. The dense point cloud may then be used for various computer aided tasks. For example, the dense point cloud may be used to generate a virtual view within the scene. A view from any position and orientation within the scene may be rendered and painted using the dense point cloud and texture information from frames of the scene. As used herein, the term frame is used to indicate a frame of video or an image of the scene as attained from a camera or set of synchronized cameras. The terms frame and image may be used interchangeably. It is noted that the accuracy and quality of the localized, dense point cloud used to render virtual views is bounded by both the first stage 102 and the second stage 104.

The second stage 104 of MVS 100 processing includes an a-priori static depth scene 126. The a-priori static depth scene is used to generate a dense point cloud of a dynamic scene as described below. In embodiments, the 3D reconstruction according to the present techniques implements a plane sweeping algorithm that "sweeps" or progresses through a number of planes in front of a given camera plane, described within the coordinate system of a captured scene. Plane-sweeping stereo tests a family of plane hypotheses by defining a set of planes, such that objects of the captured scene lie on at least one of the planes. For example, depth defines the distance of each plane to a camera plane, and a normal vector defines the 3D plane orientation with respect to the camera plane. In embodiments, a common depth and normal inference is performed pixel-wise within the natural image plane coordinate system of each camera such that by the end of the inference process, a depth map encodes the pixel-wise depth in front of a given camera plane for each camera.

In embodiments, the inference of the tested planes and normal in front of a given camera is performed by testing a similarity measure of the reference image plane compared to the perspective transform to neighboring cameras given the camera calibration, the depth, and the normal orientation. Generally, a plane and the orientation of the plane within the scene that is the most similar between multiple camera frames given a perspective transform satisfies the similarity measure. The plane sweeping technique can be applied pixel-wise or in any set of discretization within the image plane coordinate system, resulting in a pixel wise depth map per camera view.

In traditional plane sweeping techniques the lack of a-priori knowledge of the scene dictates a fixed depth range search per pixel, and is thus inefficient in terms of resolution (number of planes and the depth range to search per pixel). Moreover, the scene surface normal is also unknown. As a result, global optimization techniques are required to find the best depth and normal (4 parameters, thus 4 DOF) given a similarity measure cost function. These deficiencies limit the ability of traditional plane sweeping to be useful in real-time application in terms of depth map fidelity and time constraints. Further, traditional plane sweeping techniques combined with deep neural networks (DNNs) are also limited as the depth range should be given as input to the network, making the depth inference stage inefficient especially in cases where scene objects are in multitude of different depth ranges from the camera/sensor. Since a size of the network grows cubically when the depth search increases, these DNNs are limited by the size of the input image and the computation time. The plane sweeping with an a-priori depth map according to the present techniques overcomes these obstacles associated with traditional plane sweeping.

In particular, an a-priori knowledge of the scene shape and structure under examination reduces the number of plane hypotheses during plane sweeping as well as increases the fidelity of the resultant dense point cloud. In the examples discussed herein, the cameras (or at least most cameras) are stationary. Accordingly, the cameras have a well-known motion. Yet the structure of a dynamic scene includes a combination of a static scene (e.g., a pitch or court in sporting contexts) combined with a non-rigid dynamic scene (e.g., moving sports players and objects) in varying motion speed and direction. As discussed herein, the present techniques enable a real time dense depth map inference (e.g., 3D reconstruction in less than an inverse of a frame rate of video taken of the scene) in a combined dynamic and static scene. The present techniques also enable tracking of high frequency changes in structure in the field of view by providing per pixel depth map inference.

In embodiments, the static scene depth rendered for a camera may serve as a shape prior to enable the extraction of the depth map of the dynamic scene as captured by the same camera. Thus, the family of plane hypotheses per pixel during plane sweeping according to the present techniques may be reduced to a single depth direction relative to the stationary scene depth as already encoded in the static depth map of the scene. Further, in order to reduce computation cost, the plane normal orientation with respect to the camera plane under examination can be reduced to an orientation that is parallel to a plane vector (i.e. fronto-parallel). Accordingly, plane sweeping occurs across depth deviations from the static scene in a single fronto-parallel direction. As used herein, fronto-parallel is a direction that is parallel with the image plane.

By using the static scene depth map as a shape prior, the present techniques reduce the search problem within four degrees of freedom (depth, and normal orientation) to a discrete, well-defined pixel wise one-dimensional search during the 3D reconstruction phase. In embodiments, this reconstruction can be performed in real time, and enables the creation of a 3D scene for every set of frames captured by multiple cameras in real-time. For example, far-field range and/or real-time reconstruction may be used to capture events. These events include sporting events, competitions, shows and the like that are often broadcast for the entertainment of end users. These events may be rendered in a variety of formats. For example, a game can be rendered as a two-dimensional video or a three-dimensional immersive video. The games may be captured using one or more high-resolution cameras positioned throughout an entire event area, such as an area of play. The plurality of cameras may capture an entire three-dimensional volumetric space, including the area of play, stage, arena, and the like. In embodiments, the camera system may include multiple super high-resolution cameras for volumetric capture. In a 3D immersive video, end users can view the action of the event and move through the captured volume freely by being presented with a sequence of 2D images rendered on the 3D scene (using original cameras texture) from of any users' interactive choice of virtual view within the 3D reconstructed scene. In this case, the 3D scene is a volumetric space in which the end user can move about freely. Accordingly, an end user can view the event, such as a sporting event, from a virtual camera that follows the game action within the area of play by following the ball or a specific player in the three-dimensional volumetric space. The end users may experience real time video by streaming 2D images, given user defined virtual camera pose 6 DOF environment (e.g. any AR head set), with minimum latency and a high-quality video.

For ease of description the present techniques are described using a sporting event as the event captured by multiple cameras. However, the present techniques may be used with any event captured by multiple cameras. Moreover, the present techniques are not limited by the particular use cases as described herein. Rather, the 3D reconstruction described according to the present techniques can be used with any application where a 3D content is reconstructed from multiple images. Additionally, the depth data according to the present techniques is not limited to a particular depth representation. For example, as discussed above the depth can be based on a voxel representation or can be a pixel-wise depth for each camera view.

Figure 2:
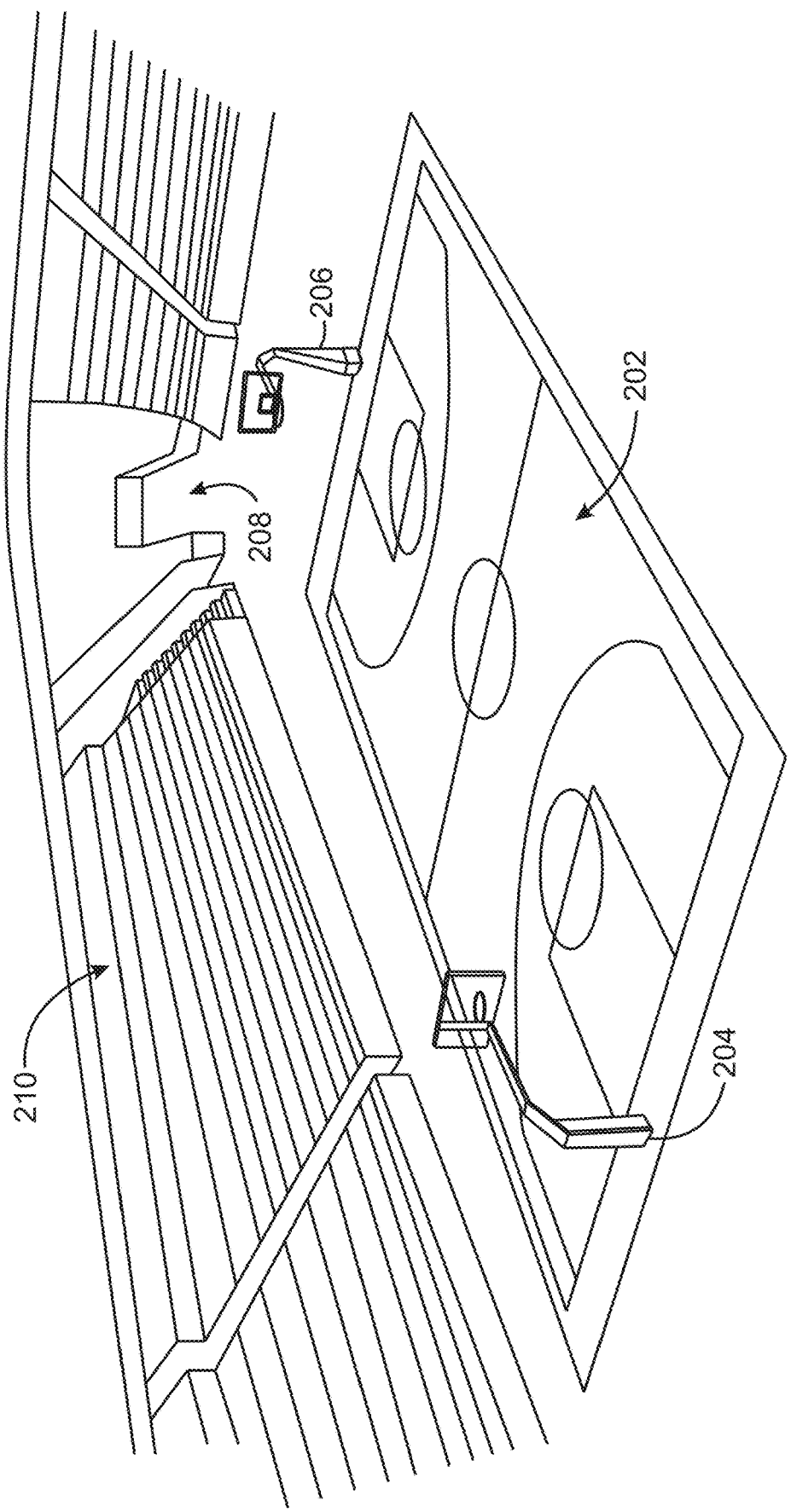
FIG. 2 is an illustration of a background image.

FIG. 2 is an illustration of a background image 200. The background image 200 represents a static scene as captured by a particular camera view. Objects in the static scene are objects that remain stationary when other, dynamic objects are present in the space. For example, static objects such as the ground 202, first goal 204, and second goal 206 are captured in the background image 200. Additionally, a court entrance area 208 and stands/seating 210 are illustrated. The background image 200 is captured by a single camera of a plurality of cameras. Other cameras from the plurality of cameras may be positioned around the scene visible in the background image 200. The other cameras may capture different views of the same scene. Thus, from a plurality of cameras, multiple images of a static scene may be captured.

Generally, the background image represents a static scene that includes stationary objects in the scene. In some cases, the static scene may be the captured area of play without any players or game play. Additionally, in some cases the static scene may include objects such as people beyond the area of play that are confined to areas outside the area of play. The dynamic scene may be a scene captured during game play, with objects and people moving throughout the area of play according to rules of the particular game being played. The dynamic scene may be non-rigid with objects moving at various speeds and directions.

From the multiple images of the static scene, depth maps may be extracted. In embodiments, the static scene is used to derive a plurality of depth planes and derive depth values associated with the static scene for each pixel in each camera view. Using the static scene as a shape prior is distinguished from traditional techniques that use particular geometry priors. For example, traditional techniques that use shape priors typically place limits on particular classes of objects, such as limiting the faces of buildings to being vertical. Traditional plane sweeping techniques may also place limits on the object being reconstructed to being a particular thing, such as a building that is captured in a scene known to have buildings.

The present techniques use depth planes derived from the static scene to constrain depth extraction of a dynamic scene, in real time. For the multiple cameras that capture the static scene, planes are selectively located in a fronto-parallel direction within the space with respect to a given camera view. The matching image patches across multiple neighboring cameras (that share an overlapped view of the scene) are warped onto a reference frame via plane-induced homography. The plane-induced homography is given by the relative pose between the reference camera, a neighbor camera, and the plane as defined herein by terms of projective geometry by the depth and normal with respect to the reference camera plane. If a particular plane is close to a dynamic object in the scene space, the warped matching images and the reference image will align in the corresponding patches. In embodiments, an optimal plane position for each pixel can be found by scoring the planes according to a similarity measure. For example, given a number of candidate correspondences from a set of planes, the similarity can be determined by a sum of absolute differences (SAD). Other similarity measures include but are not limited to the sum of squared differences (SSD) and normalized cross-correlation (NCC). Further, in embodiments, the best plane for each pixel may be the plane that minimizes matching costs. There are several aspects in determining the strategy of similarity cost extraction, for example the number of target images required to infer the reference view (to deal with occlusions), the cost function (NCC, SAD etc.) and the depth determination (weighted mean, winner-takes-it-all etc.)

By using the static scene to constrain depth extraction and ultimately 3D reconstruction of the dynamic scene, the depth inference per pixel becomes a constrained and discrete problem easily applied to parallel computing and is at least a few orders of magnitude faster than traditional plane sweeping, even when traditional plane sweeping is implemented on a graphics processing unit (GPU). In embodiments, the static depth values for each pixel for each camera view may be in the form of a depth map. Each depth map per camera view can be extracted either off line, prior to capture of the dynamic scene by software external to the 3D reconstruction application. The depth map per camera view may also be generated in real-time by dedicated rendering modules. In embodiments, a 3D model of the static scene can be generated and aligned specifically to the calibrated cameras so that cameras' pose and 3D model of the background scene co-align to the same 3D space. Thus, the static depth map of the background scene per camera view can be extracted with high accuracy, prior to the dynamic scene depth map extraction.

Figure 3:
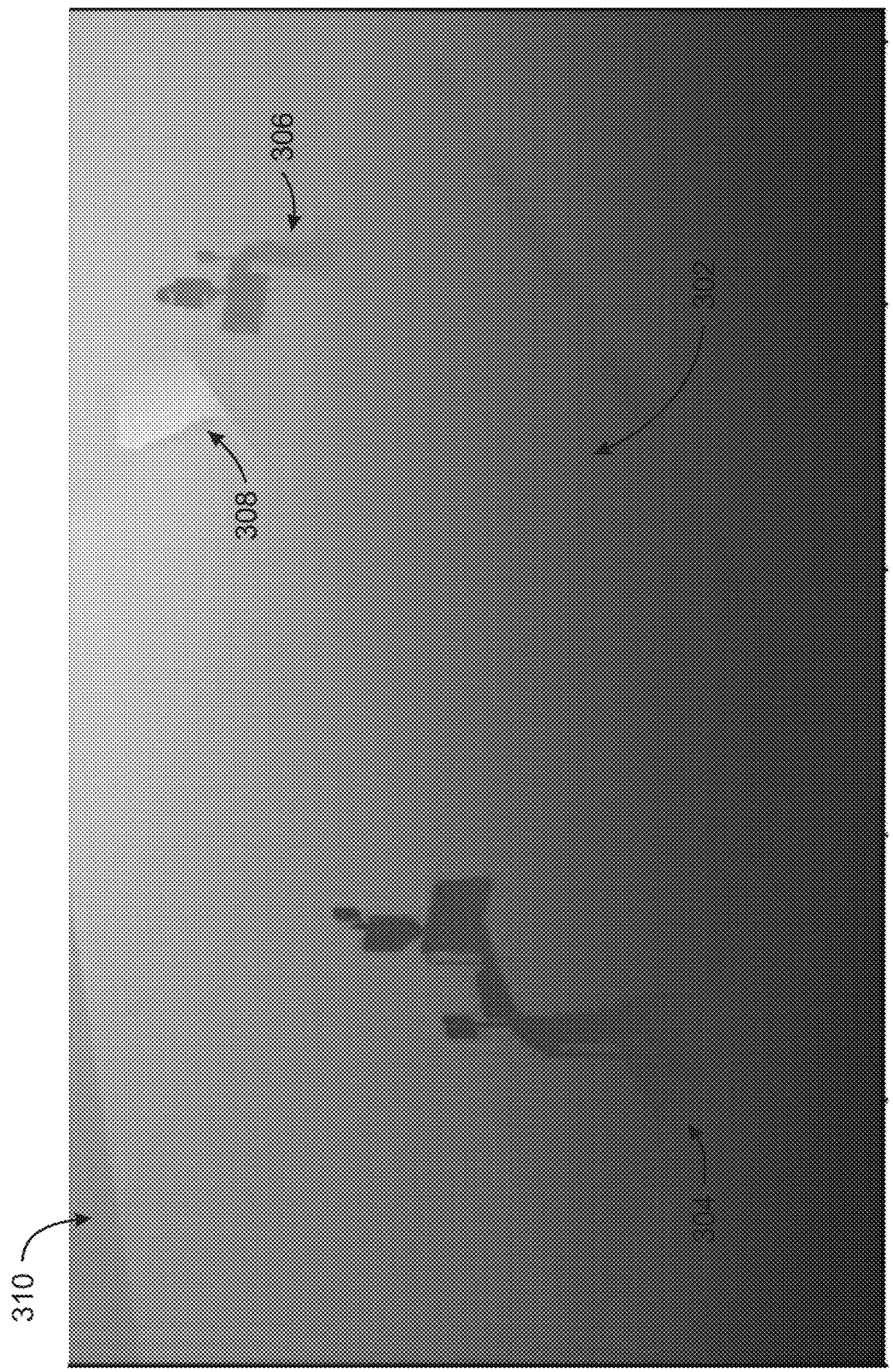
FIG. 3 is an illustration of a rendered depth of a single view camera from a background image.

FIG. 3 is an illustration of a rendered depth map 300 of a single view camera from a background image. The rendered depth map 300 may correspond to the depth extracted from the background scene 200 (FIG. 2)In this example, each pixel encodes the static scene's distance to the camera plane, i.e. the depth. In the rendered depth map 300, static objects such as the ground 302, first goal 304, and second goal 306 are visible as there are depth values associated with each of the ground 302, first goal 304, and second goal 306. Additionally, a court entrance area 308 and stands/seating 310 is also visible based on the variations in depth that occur near the court entrance area 308 and stands/seating 310, respectively. Depth planes may be derived from the background image 200 and the depth for each pixel of each camera view is illustrated as the static depth map 300.

Figure 4:
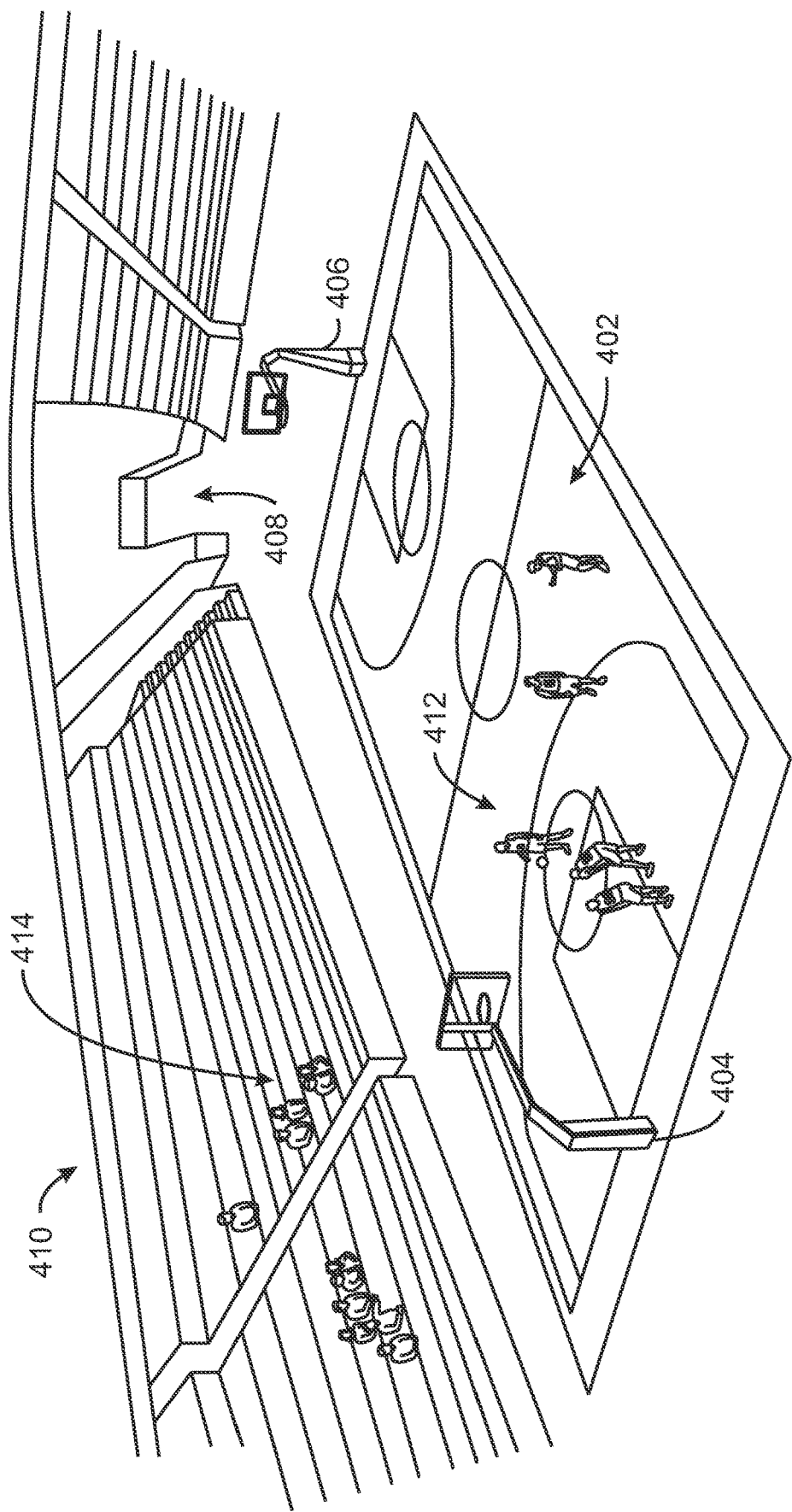
FIG. 4 is a matching camera view of the dynamic scene.

FIG. 4 is a matching camera view of the dynamic scene 400. As illustrated in FIG. 4, the court lies along the ground 402, with the first goal 404 and second goal 406 illustrated. A court entrance area 408 and stands/seating 410 are captured by the dynamic scene 400. Further, players 412 are on the court along the ground 402, and spectators 414 are in the stands/seating 410. For ease of description, the dynamic scene 400 is illustrated from a single camera view. However, in embodiments, the dynamic scene is captured by a plurality of cameras.

Constrained plane sweeping may be applied to the dynamic scenes captured by multiple cameras. As discussed generally above, plane-sweeping stereo tests a family of plane hypotheses and records for each pixel in a reference view the best plane scored by some similarity measure. The algorithm works with any number of cameras, and the images need not be rectified. In embodiments, by plane sweeping is constrained when applied to the dynamic scene by using the static scene depth values as a shape prior. This constraint reduces the family of planes to a discrete depth offset from the background scene and in the direction of the camera plane, while depth steps are taken pixel wise relative to the static scene depth. Moreover, since there is spatial connection between neighboring pixels through the static scene depth map, the plane normal estimation becomes redundant and can be reduced to a fronto-parallel normal with respect to the reference camera plane.

In embodiments, the plane sweeping with static scene depth priors can be applied easily to any deep neural network (DNN) based on plane-sweeping in terms of sweeping relative to the static scene depth unlike typical networks that require depth range and number of planes for inference generic to all pixels and views which limits its robustness and/or efficiency in cases of far-field and unknown depth range. The use of a static scene prior as described herein can make the DNN more compact, attention based, and unbounded by depth range.

The depth values obtained according to the 3D reconstruction as described herein can be applied to various use cases. For example, the reconstructed dynamic scene depth values can be used for depth map fusion. In particular, after completion of the depth inference per camera view, the entire 3D scene is reconstructed through fusion of the re-projected depth points. In another example, the reconstructed dynamic scene depth values can be used as a dynamic object shape prior. Without loss of generality of the static scene prior, dynamic objects' prior can be also retrieved. For example, when capturing a sporting event, the players' depth prior can be extracted by segmentation and localization of the players. Given that the feet of the players are most likely on the ground, thus "attached" or (closely attached) to the static scene, their initial depth is given and the rest of the player's depth can be extrapolated to a certain height not necessarily accurate (e.g. basketball player can be estimated to a total depth change from the bottom to top equivalent to 2 meters height), so that the depth inference now is performed relatively to the shape prior.

Additionally, the reconstructed dynamic scene depth values can be used for virtual camera depth extraction. For example, since the static scene is well defined, any virtual camera (pose and intrinsic parameters) can be generated and respective static depth of the virtual camera rendered. The same plane sweep procedure can be applied on the reference camera by inducing the inverse homography from target real camera views to the virtual image plane for a target-target depth inference. The output is depth map of the dynamic scene of a virtual camera and can be rendered by the real target cameras' view.

In embodiments, the depth map of dynamic scene can be used for image-based rendering. In this example, since the depth inference is based on color and texture similarity between neighboring images, a blend of those images' color and texture can be extracted to produce a view of a virtual camera.

Figure 5:
FIG. 5 is an illustration of plane sweeping results.
Figure 5:
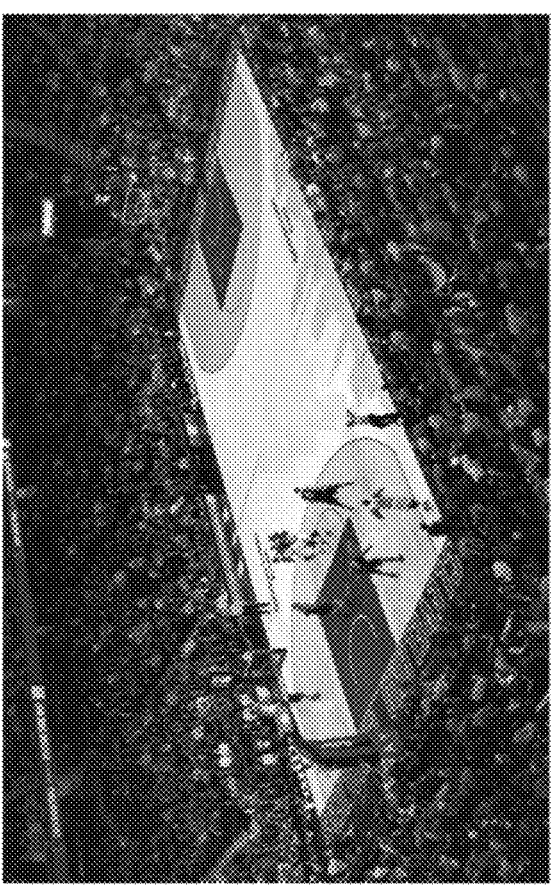
Figure 6:
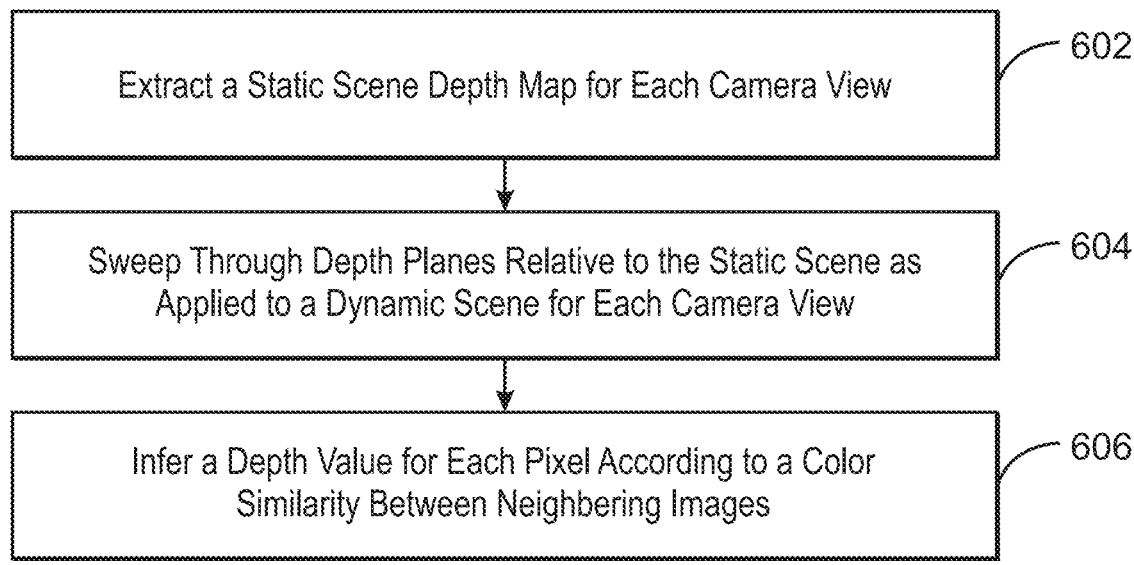
FIG. 6 is a process flow diagram of a method for depth-based 3D reconstruction based on an a-priori depth scene.

FIG. 5 is an illustration of plane sweeping results 500. In particular, FIG. 5 illustrates a dynamic image 502 captured by a single camera and its respective depth map 504 as extracted by plane sweeping stereo as described herein. FIG. 6 is a process flow diagram of a method 600 for depth-based 3D reconstruction based on an a-priori depth scene. At block 602, a static scene depth map is extracted for each camera view. In embodiments, the static scene depth map is obtained by rendering depth of a 3D detailed model of the static scene to each of the camera capturing the scene. At block 604, depth planes of the dynamic scene are swept through based on depth planes derived from the static scene for each camera view. In embodiments, the depth planes found in the static scene are used to constrain the plane sweeping direction of the dynamic scene captured by a plurality of cameras. A depth value for each pixel of the dynamic scene is inferred by inducing the plane homography transform to neighboring views and recording a similarity between the neighboring views. In embodiments, the similarity may be a color similarity, a texture similarity, or a feature similarity. At block 606, a unified 3D point cloud is fused from all inferred depth-maps of all camera views.

The process flow diagram 600 is not intended to indicate that the blocks of the example method 600 are to be executed in any particular order, or that all of the blocks are to be included in every case. Further, any number of additional blocks not shown may be included within the example method 600, depending on the details of the specific implementation.

Figure 7:
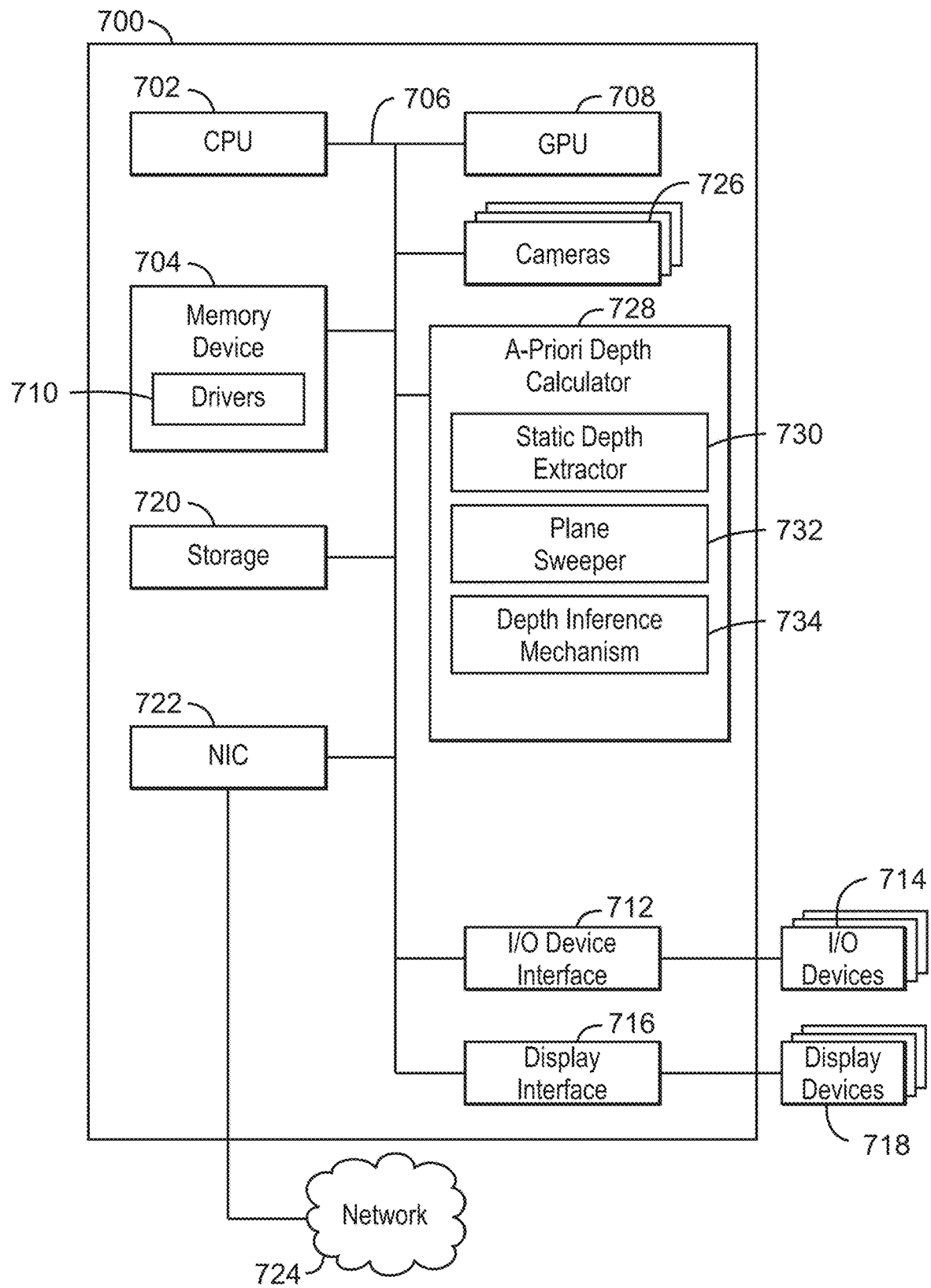
FIG. 7 a block diagram is shown of a system that enables depth-based 3D reconstruction based on an a-priori depth scene.

Referring now to FIG. 7, a block diagram is shown of a system that enables depth-based 3D reconstruction based on an a-priori depth scene. The computing device 700 may be, for example, a laptop computer, desktop computer, tablet computer, mobile device, or wearable device, among others. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random-access memory (DRAM). The memory may include drivers 710.

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a viewer of the computing device 700.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 716. The display devices 718 may include a display screen that is a built-in component of the computing device 700. The display devices 718 may also include a computer monitor, television, or projector, among others, that is internal to or externally connected to the computing device 700. The display device 716 may also include a head mounted display.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes a plurality of cameras 726. The cameras 726 may be configured to capture images. In embodiments, the cameras 726 are positioned to capture a volumetric space and are communicatively coupled with the computing device 700.

The computing device 700 includes a dense point cloud generator 728. The dense point cloud generator 728 includes a static depth map extractor 730, a dynamic scene plane sweeper 732, and a fusion mechanism 734. The static depth map extractor 730 is configured to obtain the static scene depth map by applying a plane sweeping algorithm to the static scene for each camera view. The dynamic scene plane sweeper 732 is configured to sweep through depth planes of the dynamic scene based on depth planes derived from the static scene for each camera view. The result is a depth map for each frame of each camera view of the dynamic scene. In embodiments, the depth planes found in the static scene are used to constrain the plane sweeping direction of the dynamic scene captured by a plurality of cameras. As discussed above, a depth value for each pixel of the dynamic scene is inferred by inducing the plane homography transform to neighboring views and recording a similarity between the neighboring views. The fusion mechanism 734 is configured to fuse a unified 3D point cloud from all inferred depth maps from each camera view.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. Furthermore, any of the functionalities of the dense point cloud generator 728, static depth map extractor 730, dynamic scene plane sweeper 732, and fusion mechanism 734 may be partially, or entirely, implemented in hardware and/or in the processor 702. For example, the functionality may be implemented with an application specific integrated circuit, in logic implemented in the processor 702, or in any other device. For example, the functionality of the dense point cloud generator 728 may be implemented with an application specific integrated circuit, in logic implemented in a processor, in logic implemented in a specialized graphics processing unit such as the GPU 708, or in any other device.

Figure 8:
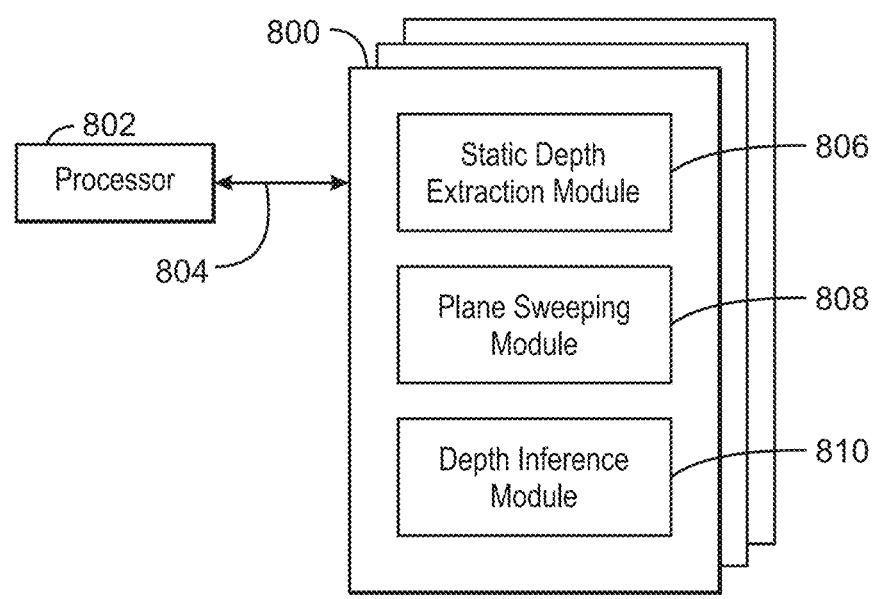
FIG. 8 is a block diagram showing computer readable media that stores code for depth-based 3D reconstruction based on an a-priori depth scene.

FIG. 8 is a block diagram showing computer readable media 800 that stores code for depth-based 3D reconstruction based on an a-priori depth scene. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a static depth map extraction module 806 may be configured to obtain the static scene depth map by applying a plane sweeping algorithm to the static scene for each camera view. A dynamic scene plane sweeping module 808 may be configured to sweep through depth planes of the dynamic scene based on depth planes derived from the static scene for each camera view. The result is a depth map for each frame of each camera view of the dynamic scene. In embodiments, the depth planes found in the static scene are used to constrain the plane sweeping direction of the dynamic scene captured by a plurality of cameras. A fusion module 810 may be configured to fuse a unified 3D point cloud from all inferred depth maps from each camera view.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

EXAMPLES

Example 1 is a system for depth-based 3D reconstruction using a a-priori depth scene. The system includes a static depth map extractor to a static scene depth map of a scene for a plurality of camera views; a dynamic scene plane sweeper to sweep through depth planes of a dynamic scene based on the depth map from the static scene to infer a depth map of the dynamic scene for each camera view; and a fusion mechanism to fuse a three-dimensional point cloud from the depth map of the dynamic scene for each camera view.

Example 2 includes the system of example 1, including or excluding optional features. In this example, the inference of a depth map of the dynamic scene for each camera view uses depth planes derived from the static scene to constrain the plane sweeping direction of the dynamic scene.

Example 3 includes the system of any one of examples 1 to 2, including or excluding optional features. In this example, the static scene depth map is derived by plane sweeping the static scene.

Example 4 includes the system of any one of examples 1 to 3, including or excluding optional features. In this example, inferring a depth map of the dynamic scene for each camera view is executed by a neural network.

Example 5 includes the system of any one of examples 1 to 4, including or excluding optional features. In this example, sweeping through depth planes of the dynamic scene tests a reduced family of plane hypotheses based on depth planes derived from the static scene, and records a best plane for each pixel in a reference view, wherein the planes are scored by a similarity measure.

Example 6 includes the system of any one of examples 1 to 5, including or excluding optional features. In this example, sweeping through depth planes of a dynamic scene based on the depth map from the static scene reduces the plane normal to a fronto-parallel normal relative to a reference camera.

Example 7 includes the system of any one of examples 1 to 6, including or excluding optional features. In this example, the system includes generating virtual camera parameters comprising pose and intrinsic parameters and rendering a virtual camera view via the fused three-dimensional point cloud.

Example 8 includes the system of any one of examples 1 to 7, including or excluding optional features. In this example, the system includes capturing the plurality of camera views via a plurality of cameras with known structure and motion.

Example 9 includes the system of any one of examples 1 to 8, including or excluding optional features. In this example, the fusion mechanism fuses the 3D point cloud from the depth map of the dynamic scene for each camera view in real time to generate a dense point cloud.

Example 10 is a method for depth-based 3D reconstruction using a a-priori depth scene. The method includes extracting a static scene depth map of a scene for a plurality of camera views; sweeping through depth planes of a dynamic scene based on the depth map from the static scene to infer a depth map of the dynamic scene for each camera view; and fusing a three-dimensional point cloud from the depth map of the dynamic scene for each camera view.

Example 11 includes the method of example 10, including or excluding optional features. In this example, the inference of a depth map of the dynamic scene for each camera view uses depth planes derived from the static scene to constrain the plane sweeping direction of the dynamic scene.

Example 12 includes the method of any one of examples 10 to 11, including or excluding optional features. In this example, the static scene depth map is derived by plane sweeping the static scene.

Example 13 includes the method of any one of examples 10 to 12, including or excluding optional features. In this example, inferring the depth value for each pixel in the dynamic scene is executed by a neural network.

Example 14 includes the method of any one of examples 10 to 13, including or excluding optional features. In this example, sweeping through depth planes of the dynamic scene tests a reduced family of plane hypotheses based on depth planes derived from the static scene, and records a best plane for each pixel in a reference view, wherein the planes are scored by a dissimilarity measure.

Example 15 includes the method of any one of examples 10 to 14, including or excluding optional features. In this example, sweeping through depth planes of a dynamic scene based on the depth map from the static scene reduces the plane normal to a fronto-parallel normal relative to a reference camera.

Example 16 includes the method of any one of examples 10 to 15, including or excluding optional features. In this example, the method includes generating virtual camera parameters comprising pose and intrinsic parameters and rendering a virtual camera view via the fused three-dimensional point cloud.

Example 17 includes the method of any one of examples 10 to 16, including or excluding optional features. In this example, the method includes capturing the plurality of camera views via a plurality of cameras with known structure and motion.

Example 18 includes the method of any one of examples 10 to 17, including or excluding optional features. In this example, the method includes fusing the 3D point cloud from the depth map of the dynamic scene for each camera view in real time to generate a dense point cloud.

Example 19 is at least one computer readable medium for depth-based 3D reconstruction using a a-priori depth scene having instructions stored therein that. The computer-readable medium includes instructions that direct the processor to extract a static scene depth map of a scene for a plurality of camera views; sweep through depth planes of a dynamic scene based on the depth map from the static scene to infer a depth map of the dynamic scene for each camera view; and fuse a three-dimensional point cloud from the depth map of the dynamic scene for each camera view.

Example 20 includes the computer-readable medium of example 19, including or excluding optional features. In this example, the computer-readable medium includes least one computer readable medium of claim 19, the inference of a depth map of the dynamic scene for each camera view uses depth planes derived from the static scene to constrain the plane sweeping direction of the dynamic scene.

Example 21 includes the computer-readable medium of any one of examples 19 to 20, including or excluding optional features. In this example, the static scene depth map is derived by plane sweeping the static scene.

Example 22 includes the computer-readable medium of any one of examples 19 to 21, including or excluding optional features. In this example, inferring the depth value for each pixel in the dynamic scene is executed by a neural network.

Example 23 includes the computer-readable medium of any one of examples 19 to 22, including or excluding optional features. In this example, sweeping through depth planes of the dynamic scene tests a reduced family of plane hypotheses based on depth planes derived from the static scene, and records a best plane for each pixel in a reference view, wherein the planes are scored by a dissimilarity measure.

Example 24 includes the computer-readable medium of any one of examples 19 to 23, including or excluding optional features. In this example, sweeping through depth planes of a dynamic scene based on the depth map from the static scene reduces the plane normal to a fronto-parallel normal relative to a reference camera.

Example 25 includes the computer-readable medium of any one of examples 19 to 24, including or excluding optional features. In this example, the computer-readable medium includes generating virtual camera parameters comprising pose and intrinsic parameters and rendering a virtual camera view via the fused three-dimensional point cloud.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for depth-based 3D reconstruction, comprising:
   memory;
   instructions;
   processor circuitry to execute the instructions to:
      extract a first depth map of a first static scene for a first camera view of a plurality of camera views;
      infer a second depth map of a first dynamic scene for the first camera view based on the first depth map and a sweep through a plurality of depth planes of the first dynamic scene, the plurality of depth planes defined by a normal corresponding to a fronto-parallel normal relative to the first camera view; and
      fuse a three-dimensional (3D) point cloud from the second depth map of the first dynamic scene and from a third depth map of a second dynamic scene associated with a second camera view of the plurality of camera views.

2. The system of claim 1, wherein the processor circuitry is to derive the plurality of depth planes from the first static scene to constrain a plane sweeping direction of the first dynamic scene.

3. The system of claim 1, wherein the processor circuitry is to extract the first depth map by plane sweeping the first static scene.

4. The system of claim 1, wherein the processor circuitry is to infer the second depth map of the first dynamic scene based on a neural network.

5. The system of claim 1, wherein the processor circuitry is to:
   test a reduced family of plane hypotheses based on depth planes derived from the first static scene;
   score different planes in the family of plane hypotheses based on a similarity measure; and
   designate respective planes for corresponding pixels in a reference view, the designated planes determined based on the similarity measure associated with respective ones of the different planes in the family of plane hypotheses.

6. The system of claim 1, wherein the processor circuitry is to:
   generate virtual camera parameters including pose and intrinsic parameters; and
   cause rendering of a virtual camera view based on the fused 3D point cloud.

7. The system of claim 1, wherein the processor circuitry is to cause capturing of the plurality of camera views via a plurality of cameras with known stationary positions.

8. The system of claim 1, wherein the processor circuitry is to fuse the 3D point cloud from the second depth map of the first dynamic scene for different ones of the plurality of camera views in real time to generate a point cloud that is denser than the second depth map and denser than the third depth map.

9. The system of claim 1, wherein the first static scene and the first dynamic scene correspond to a same view of an area, the first dynamic scene to differ from the first static scene based on a dynamic object in the first dynamic scene.

10. The system of claim 9, wherein the first static scene is captured by a first camera at a first point in time, and the first dynamic scene is captured by the first camera at a second point in time after the first point in time.

11. The system of claim 9, wherein the same view of the area corresponds to the first camera view, and the second dynamic scene corresponds to a second camera view of the area, the second dynamic scene including the dynamic object of the first dynamic scene, the second camera view corresponding to a different perspective of the area than the first camera view.

12. The system of claim 1, wherein the fronto-parallel normal is a normal of a plane extending in a direction parallel with an image plane associated with the first camera view.

13. A method for depth-based 3D reconstruction, comprising:
   extracting a first depth map of a first static scene for a first camera view of a plurality of camera views;
   sweeping through a plurality of depth planes of a first dynamic scene based on the first depth map of the first static scene to infer a second depth map of the first dynamic scene for the first camera view, corresponding ones of the depth planes having a respective normal corresponding to a fronto-parallel normal relative to the first camera view; and fusing a three-dimensional (3D) point cloud from the second depth map of the first dynamic scene and from a third depth map of a second dynamic scene associated with a second camera view of the plurality of camera views.

14. The method of claim 13, including deriving the plurality of depth planes from the first static scene to constrain a plane sweeping direction of the first dynamic scene.

15. The method of claim 13, wherein the first depth map of the first static scene is derived by plane sweeping the first static scene.

16. The method of claim 13, wherein the inferring of the second depth map of the first dynamic scene is executed using a neural network.

17. The method of claim 13, wherein the sweeping through the plurality of depth planes of the first dynamic scene includes:
   testing a reduced family of plane hypotheses based on depth planes derived from the first static scene;
   scoring different planes in the family of plane hypotheses based on a similarity measure; and
   recording a designated plane for each pixel in a reference view, the designated plane determined based on the similarity measure associated with respective ones of the different planes in the family of plane hypotheses.

18. The method of claim 13, further including:
   generating virtual camera parameters including pose and intrinsic parameters; and
   rendering a virtual camera view based on the fused 3D point cloud.

19. The method of claim 13, further including capturing the plurality of camera views via a plurality of cameras with known stationary positions.

20. The method of claim 13, further including fusing the 3D point cloud to generate a point cloud that is denser than the second depth map and denser than the third depth map.

21. At least one computer readable storage device comprising instructions to cause at least one computing device to:
   extract a first depth map of a first static scene for a first camera view of a plurality of camera views;
   infer a second depth map of a first dynamic scene for the first camera view from a sweep through a plurality of depth planes of the first dynamic scene based on the first depth map, the plurality of depth planes corresponding to a fronto-parallel normal relative to the first camera view; and
   fuse a three-dimensional (3D) point cloud from the second depth map of the first dynamic scene and from a third depth map of a second dynamic scene associated with a second camera view of the plurality of camera views.

22. The at least one computer readable storage device of claim 21, wherein the instructions cause the computing device to derive the plurality of depth planes from the first static scene to constrain a plane sweeping direction of the first dynamic scene.

23. The at least one computer readable storage device of claim 21, wherein the instructions cause the computing device to extract the first depth map by plane sweeping the first static scene.

24. The at least one computer readable storage device of claim 21, wherein the instructions cause the computing device to infer the second depth map of the first dynamic scene using a neural network.

25. The at least one computer readable storage device of claim 21, wherein the instructions cause the computing device to evaluate the plurality of depth planes of the first dynamic scene by:
   testing a reduced family of plane hypotheses based on depth planes derived from the first static scene;
   scoring different planes in the family of plane hypotheses based on a similarity measure; and
   recording a designated plane for each pixel in a reference view, the designated plane determined based on the similarity measure associated with respective ones of the different planes in the family of plane hypotheses.

26. The at least one computer readable storage device of claim 21, wherein the instructions cause the computing device to:
   generate virtual camera parameters including pose and intrinsic parameters; and
   render a virtual camera view based on the fused 3D point cloud.

* * * * *